US011552343B2

(12) United States Patent
Kim et al.

(10) Patent No.: US 11,552,343 B2
(45) Date of Patent: Jan. 10, 2023

(54) APPARATUS AND METHOD FOR ESTIMATING TEMPERATURE OF BATTERY

(71) Applicant: LG CHEM, LTD., Seoul (KR)

(72) Inventors: Se-Won Kim, Daejeon (KR); Ha-Neul Yoo, Daejeon (KR); Jong-Soo Ha, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 283 days.

(21) Appl. No.: 16/609,314

(22) PCT Filed: Aug. 13, 2018

(86) PCT No.: PCT/KR2018/009270
§ 371 (c)(1),
(2) Date: Oct. 29, 2019

(87) PCT Pub. No.: WO2019/093627
PCT Pub. Date: May 16, 2019

(65) Prior Publication Data
US 2020/0067148 A1 Feb. 27, 2020

(30) Foreign Application Priority Data

Nov. 7, 2017 (KR) .................. 10-2017-0147195

(51) Int. Cl.
*G01K 7/00* (2006.01)
*H01M 10/48* (2006.01)
(Continued)

(52) U.S. Cl.
CPC ............ *H01M 10/486* (2013.01); *G01K 7/22* (2013.01); *G01K 13/00* (2013.01); *H01M 10/425* (2013.01); *H01M 2010/4271* (2013.01)

(58) Field of Classification Search
CPC ............ H01M 10/486; H01M 10/425; H01M 2010/4271; H01M 10/443;
(Continued)

(56) References Cited

U.S. PATENT DOCUMENTS 5,495,095 A * 2/1996 de Matteis ........... G05B 19/106
219/506
9,702,761 B2 7/2017 Antonini et al.
(Continued)

FOREIGN PATENT DOCUMENTS

CN 101685871 A 3/2010
CN 204188776 U * 3/2015
(Continued)

OTHER PUBLICATIONS

International Search Report issued in corresponding International Patent Application No. PCT/KR2018/009270, dated Nov. 26, 2018.
(Continued)

*Primary Examiner* — Gail Kaplan Verbitsky
(74) *Attorney, Agent, or Firm* — Morgan, Lewis & Bockius LLP

(57) ABSTRACT

The present disclosure discloses an apparatus for estimating temperature of at least one secondary battery in a battery pack including at least one secondary battery. The battery temperature estimation apparatus according to the present disclosure is an apparatus for estimating temperature of at least one secondary battery in a battery pack including at least one secondary battery, and includes a board temperature measuring unit provided on an integrated circuit board provided in the battery pack to measure a temperature of the integrated circuit board, and a calculating unit which calculates a temperature of the secondary battery using the
(Continued)

temperature of the integrated circuit board measured by the board temperature measuring unit and an ambient temperature of the battery pack.

14 Claims, 11 Drawing Sheets

(51) Int. Cl.
*G01K 7/22* (2006.01)
*G01K 13/00* (2021.01)
*H01M 10/42* (2006.01)

(58) Field of Classification Search
CPC ..... H01M 8/04701; G01K 7/22; G01K 13/00; G01K 7/427; G01K 7/42; Y02E 60/10
USPC ............... 374/1, 170, 178, 4, 57; 702/63, 57
See application file for complete search history.

(56) References Cited

U.S. PATENT DOCUMENTS

| | | | |
|---|---|---|---|
| 10,086,718 B2 * | 10/2018 | Wang | B60L 58/16 |
| 2002/0126733 A1 * | 9/2002 | Blankenagel | G01K 15/00 374/1 |
| 2006/0122473 A1 * | 6/2006 | Kill | G01K 1/024 600/300 |
| 2009/0154048 A1 * | 6/2009 | Jang | H01M 50/543 361/106 |
| 2014/0055095 A1 * | 2/2014 | Kim | H02J 7/0031 320/134 |
| 2014/0140369 A1 | 5/2014 | Erhart | |
| 2015/0044511 A1 | 2/2015 | Kim et al. | |
| 2016/0064972 A1 * | 3/2016 | Stefanopoulou | H01M 10/48 320/116 |
| 2016/0079633 A1 | 3/2016 | Wahlstrom et al. | |
| 2017/0033575 A1 * | 2/2017 | Kaji | H02J 7/0029 |
| 2017/0082694 A1 * | 3/2017 | Yonemoto | H01M 10/486 |
| 2017/0244138 A1 | 8/2017 | Yang | |
| 2017/0264123 A1 * | 9/2017 | Mulawski | H02J 7/007192 |
| 2018/0151919 A1 | 5/2018 | Sasaki et al. | |
| 2019/0221898 A1 * | 7/2019 | Machida | H01M 10/425 |

FOREIGN PATENT DOCUMENTS

| | | | | |
|---|---|---|---|---|
| CN | 106233527 A | * | 12/2016 | ........... G01R 31/389 |
| CN | 106549196 A | | 3/2017 | |
| CN | 106872047 A | * | 6/2017 | |
| CN | 208570832 U | * | 3/2019 | |
| DE | 102015115072 A1 | | 3/2016 | |
| EP | 2835846 A1 | * | 2/2015 | .......... H01M 10/425 |
| EP | 3107146 A1 | | 12/2016 | |
| EP | 3 154 120 A1 | | 4/2017 | |
| EP | 3154120 A1 | | 4/2017 | |
| EP | 3154120 A1 | * | 4/2017 | .............. B60L 53/53 |
| JP | H888027 A | * | 4/1996 | |
| JP | 2005-265825 A | | 9/2005 | |
| JP | 2006032612 A | * | 2/2006 | |
| JP | 2006332345 A | * | 12/2006 | ........... H01S 5/0683 |
| JP | 3936542 B2 | | 6/2007 | |
| JP | 3936542 B2 | * | 6/2007 | .......... B60L 11/1861 |
| JP | 4165995 B2 | * | 10/2008 | ............ H01M 10/36 |
| JP | 2008271781 A | * | 11/2008 | |
| JP | 2009-081958 A | | 4/2009 | |
| JP | 2010-123517 A | | 6/2010 | |
| JP | WO2011045853 A1 | * | 3/2013 | |
| JP | 5874560 B2 | | 3/2016 | |
| JP | 2016-100288 A | | 5/2016 | |
| JP | 2016125932 A | * | 7/2016 | |
| JP | 2016-211851 A | | 12/2016 | |
| JP | 2016207383 A | * | 12/2016 | |
| KR | 2009054792 A | * | 6/2009 | |
| KR | 10-2014-0025652 A | | 3/2014 | |
| KR | 10-2016-0051198 A | | 5/2016 | |
| KR | 10-1628850 B1 | | 6/2016 | |
| KR | 10-1751786 B1 | | 6/2017 | |
| KR | 10-2017-0099589 A | | 9/2017 | |
| KR | 10-2017-0116634 A | | 10/2017 | |
| WO | 2010/049795 A1 | | 5/2010 | |
| WO | WO-2010049795 A1 | * | 5/2010 | .......... H01M 10/441 |
| WO | 2012/153239 A1 | | 11/2012 | |
| WO | 2014/208105 A1 | | 12/2014 | |
| WO | 2016/038658 A1 | | 3/2016 | |
| WO | WO-2016051616 A1 | * | 4/2016 | ........ H01M 10/0525 |
| WO | 2016/153268 A1 | | 9/2016 | |
| WO | 2016/185343 A2 | | 11/2016 | |
| WO | 2016/190293 A1 | | 12/2016 | |
| WO | WO2019093627 A | * | 5/2019 | |
| WO | WO-2019093627 A1 | * | 5/2019 | ............... G01K 7/22 |

OTHER PUBLICATIONS

Office Action dated Sept. 8, 2020, issued in corresponding Japanese Patent Application No. 2019-548281.
Extended European Search Report dated May 19, 2020, issued in corresponding European Patent Application No. 18875661.3.
Office Action issued by the Chinese Patent Office dated Mar. 9, 2022 in corresponding Chinese Patent Application No. 201880024268.5.
Office Action dated Jul. 13, 2022, issued in corresponding Chinese Patent Application No. 201880024268.5.

* cited by examiner

FIG. 5

|     | Measured ambient temperature(°C) | Correction factor |
| --- | --- | --- |
| (a) | −20 | 1.19 |
| (b) | 0   | 1.18 |
| (c) | 10  | 1.15 |
| (d) | 20  | 1.05 |
| (e) | 25  | 1.06 |
| (f) | 50  | 0.95 |

APPARATUS AND METHOD FOR ESTIMATING TEMPERATURE OF BATTERY

TECHNICAL FIELD

The present disclosure relates to an apparatus and method for estimating the temperature of a battery, and more particularly, to estimating the temperature of at least one secondary battery in a battery pack including at least one secondary battery.

The present application claims priority to Korean Patent Application No. 10-2017-0147195 filed in the Republic of Korea on Nov. 7, 2017, the disclosures of which are incorporated herein by reference.

BACKGROUND ART

Recently, there is dramatically growing demand for portable electronic products such as laptop computers, video cameras and mobile phones, and with the extensive development of accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

Batteries are used in various fields, and in many cases, large capacity is required in the field in which batteries are used so much in recent years such as electric-drive vehicles or smart grid systems. To increase the capacity of battery packs, methods for increasing the capacity of secondary batteries or battery cells themselves may be used, but in this case, disadvantages are that the capacity increase effect is not so large, there is a physical limitation on the size expansion of the secondary batteries and it is not easy to manage. Accordingly, generally, a battery pack including a plurality of battery modules connected in series and in parallel is widely used.

In many cases, the battery pack includes a Battery Management System (BMS) to manage the battery modules. Further, the BMS monitors the temperature, voltage and current of the battery modules, and controls the balancing operation, cooling operation, charging operation or discharging operation of the battery pack based on the monitored condition of the battery modules.

The temperature of the battery modules, i.e., the temperature of the secondary batteries is a factor that has a critical influence on the performance of the battery pack. In general, the battery pack can efficiently operate when the secondary batteries have an appropriate temperature distribute. For example, when the temperature of the secondary battery is too high, the stability of the crystal lattice of the negative electrode of the secondary battery reduces, and the performance of the battery pack may degrade. On the contrary, when the temperature of the secondary battery is too low, the internal resistance and polarization voltage of the secondary battery increases and the charging/discharging capacity reduces, resulting in performance degradation of the battery pack.

Accordingly, the balancing operation, cooling operation, charging operation or discharging operation of the battery pack needs to be appropriately controlled depending on the temperature of the secondary battery. Additionally, to this end, it is necessary to accurately measure the temperature of the secondary battery, and transmit the measured temperature of the secondary battery to the Micro Controller Unit (MCU) of the BMS.

To accurately obtain the temperature of the secondary battery, the conventional battery pack has a temperature sensor in direct contact with the secondary battery or mounted at a location close to the secondary battery. However, in this case, the energy density of the battery pack may reduce due to the temperature sensor disposed close to the secondary battery. Specifically, to increase the energy density of the battery pack, it is important that the battery pack includes a larger number of secondary batteries therein. However, when the temperature sensor in direct contact with or close to the secondary battery is disposed between secondary batteries, the internal space of the battery pack reduces, thus the number of secondary batteries that can be accommodated in the battery pack reduces.

DISCLOSURE

Technical Problem

The present disclosure is designed to solve the above-described problem, and therefore the present disclosure is directed to providing a battery temperature estimation apparatus and method for effectively estimating the temperature of a secondary battery included in a battery module without placing a temperature sensor in contact with or in proximity to the secondary battery.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

To achieve the above-described object, a battery temperature estimation apparatus according to an embodiment of the present disclosure is an apparatus for estimating temperature of at least one secondary battery in a battery pack including at least one secondary battery, and includes a board temperature measuring unit mounted on an integrated circuit board provided in the battery pack to measure a temperature of the integrated circuit board, and a calculating unit configured to calculate a temperature of the secondary battery using the temperature of the integrated circuit board measured by the board temperature measuring unit and an ambient temperature of the battery pack.

Additionally, the calculating unit may be configured to calculate the temperature of the secondary battery by reflecting a correction factor corresponding to the ambient temperature of the battery pack on a difference between the temperature of the integrated circuit board and the ambient temperature of the battery pack.

Additionally, the calculating unit may be configured to calculate the temperature of the secondary battery using a value obtained by multiplying the difference between the temperature of the integrated circuit board and the ambient temperature of the battery pack by the correction factor.

Additionally, the calculating unit may be configured to calculate the temperature of the secondary battery by adding the ambient temperature of the battery pack to the value obtained by multiplying the difference between the temperature of the integrated circuit board and the ambient temperature of the battery pack by the correction factor.

The battery temperature estimation apparatus according to the present disclosure may further include a memory unit which stores a correction factor corresponding to the ambient temperature of the battery pack. The memory unit may be configured to transmit the stored correction factor to the calculating unit.

Additionally, the memory unit may store the correction factor defined based on the measured temperature of the secondary battery, the measured temperature of the integrated circuit board and the measured ambient temperature of the battery pack, obtained through a temperature measurement experiment.

Additionally, the correction factor may have a correction coefficient defined based on a mean value obtained by dividing a difference value between the measured temperature of the secondary battery and the measured ambient temperature of the battery pack by a difference value between the measured temperature of the integrated circuit board and the measured ambient temperature of the battery pack, and the measured ambient temperature of the battery pack.

Additionally, the calculating unit may be configured to calculate the temperature of the secondary battery using the correction coefficient.

Additionally, the battery temperature estimation apparatus according to the present disclosure may further include an ambient temperature measuring unit configured to measure the ambient temperature of the battery pack, and transmit the measured ambient temperature to the calculating unit.

Additionally, to achieve the above-described object, a battery pack according to the present disclosure includes the battery temperature estimation apparatus according to the present disclosure.

Additionally, a battery temperature estimation method according to the present disclosure is a method for estimating temperature of at least one secondary battery in a battery pack including at least one secondary battery, and includes measuring a temperature of an integrated circuit board provided in the battery pack, and calculating a temperature of the secondary battery by reflecting a correction factor corresponding to an ambient temperature of the battery pack on a difference between the temperature of the integrated circuit board measured in the temperature measuring step and the ambient temperature of the battery pack.

Advantageous Effects

According to the present disclosure, it is possible to estimate the temperature of the secondary battery quickly and accurately without actually measuring the temperature of the secondary battery from a temperature sensor disposed in contact with or close to the secondary battery.

Particularly, according to an aspect of the present disclosure, it is possible to estimate the temperature of the secondary battery using the temperature measured on the integrated circuit board. In this case, the temperature sensor does not need to extend and be disposed in the proximity of the secondary battery, and the utilization of the internal space of the battery pack improves.

Moreover, according to another aspect of the present disclosure, it is possible to estimate the temperature of the secondary battery based on a simple compensation logic without actually measuring the temperature of the secondary battery from a temperature sensor in contact with the secondary battery or disposed near the secondary battery.

Therefore, according to this aspect of the present disclosure, the battery pack can accommodate a larger number of secondary batteries, thereby improving the energy density of the battery pack.

The present disclosure may have a variety of other effects, and these and other effects can be understood by the following description and will be apparent from the embodiments of the present disclosure.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

FIG. 5 is a chart showing a correction factor corresponding to the measured ambient temperature of a battery pack according to an embodiment of the present disclosure.

MODE FOR CARRYING OUT THE INVENTION

Figure 1:
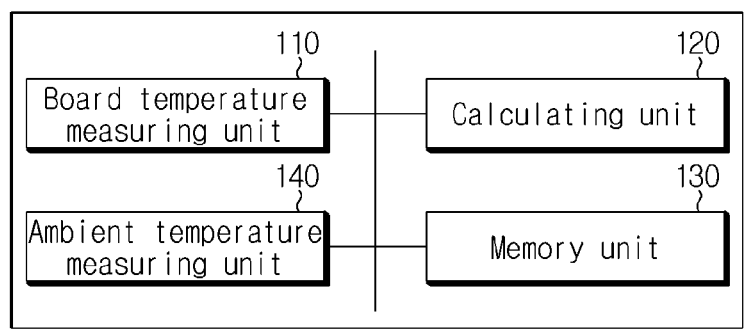
FIG. 1 is a schematic block diagram showing a functional configuration of a battery temperature estimation apparatus according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

A battery temperature estimation apparatus according to the present disclosure is an apparatus for estimating the temperature of a battery. Here, the battery may include at least one secondary battery. The battery temperature estimation apparatus according to the present disclosure may estimate the temperature of at least one of secondary batteries included in a battery pack. Particularly, the battery temperature estimation apparatus according to the present disclosure may be applied to a battery including at least one lithium secondary battery. Here, the battery may be a concept encompassing a battery module or a battery pack.

FIG. 1 is a schematic block diagram showing a functional configuration of a battery temperature estimation apparatus according to an embodiment of the present disclosure.

Referring to FIG. 1, the battery temperature estimation apparatus according to the present disclosure may include a board temperature measuring unit 110 and a calculating unit 120.

The board temperature measuring unit 110 may measure the temperature of an integrated circuit board. Here, the integrated circuit board refers to a board having at least one element connected to at least one secondary battery provided in a battery pack to transmit information between the secondary battery and a battery management system (BMS). For example, the integrated circuit board with the board temperature measuring unit 110 may be an Integrated Circuit Board (ICB) provided in the battery pack. Here, the ICB refers to an integrated circuit board mounted on a sensing assembly provided in the battery pack to transmit information sensed from an electrode lead of the secondary battery to the BMS.

Particularly, the board temperature measuring unit 110 may be mounted on the integrated circuit board provided in the battery pack to measure the temperature of the integrated circuit board. That is, the board temperature measuring unit 110 may be attached to the integrated circuit board. In other words, the board temperature measuring unit 110 may be mounted on the integrated circuit board by soldering.

Figure 2:
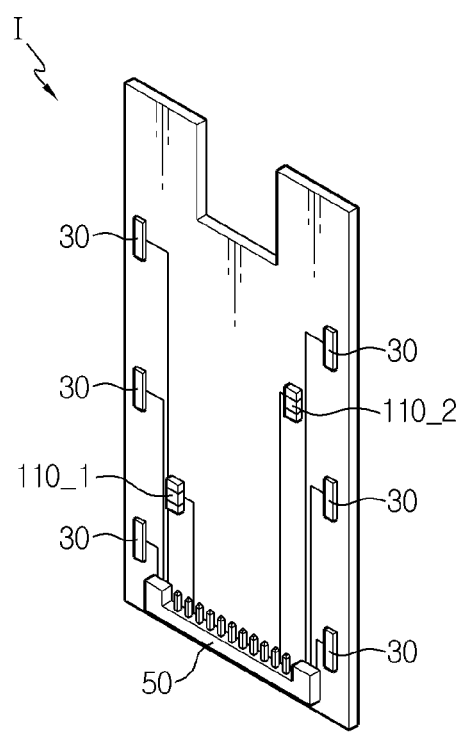
FIG. 2 is a schematic perspective view showing that a board temperature measuring unit of a battery temperature estimation apparatus according to an embodiment of the present disclosure is mounted on an integrated circuit board (ICB).

FIG. 2 is a schematic perspective view showing that the battery temperature measuring unit of the battery temperature estimation apparatus according to an embodiment of the present disclosure is mounted on the integrated circuit board.

Referring to FIG. 2, the integrated circuit board I may include a busbar connector 30, a BMS connector 50 and a board temperature measuring unit 110 (a first board temperature measuring unit 110_1 and a second board temperature measuring unit 110_2).

The busbar connector 30 may connect a sensing busbar that contacts the electrode lead of the secondary battery and the integrated circuit board I. Additionally, the BMS connector 50 may be electrically connected to the busbar connector 30 to transmit information sensed from the secondary battery to the BMS. For example, the integrated circuit board I may be implemented as a PCB substrate, and in this instance, the circuit connecting the busbar connector 30 and the BMS connector 50 may be printed on the PCB substrate. However, the circuit printed pattern of the integrated circuit board I shown in FIG. 2 is for illustration purposes only, and the circuit of the integrated circuit board I may be printed in any other patterns.

A plurality of board temperature measuring units 110 may be provided. Here, the temperature measured by the plurality of board temperature measuring units 110 may be used to estimate the temperatures of different secondary batteries. For example, as shown in the configuration of FIG. 2, the board temperature measuring unit 110 may include the first board temperature measuring unit 110_1 and the second board temperature measuring unit 110_2.

The board temperature measuring unit 110 may be mounted on the integrated circuit board I in the form of a chip thermistor. For example, the terminal of the chip thermistor may be mounted in the integrated circuit board I by soldering on the circuit. Alternatively, the terminal of the chip thermistor may contact the integrated circuit board I. For example, the board temperature measuring unit 110 may be implemented as a Negative Temperature Coefficient of Thermistor (NTC Thermistor).

Figure 3:
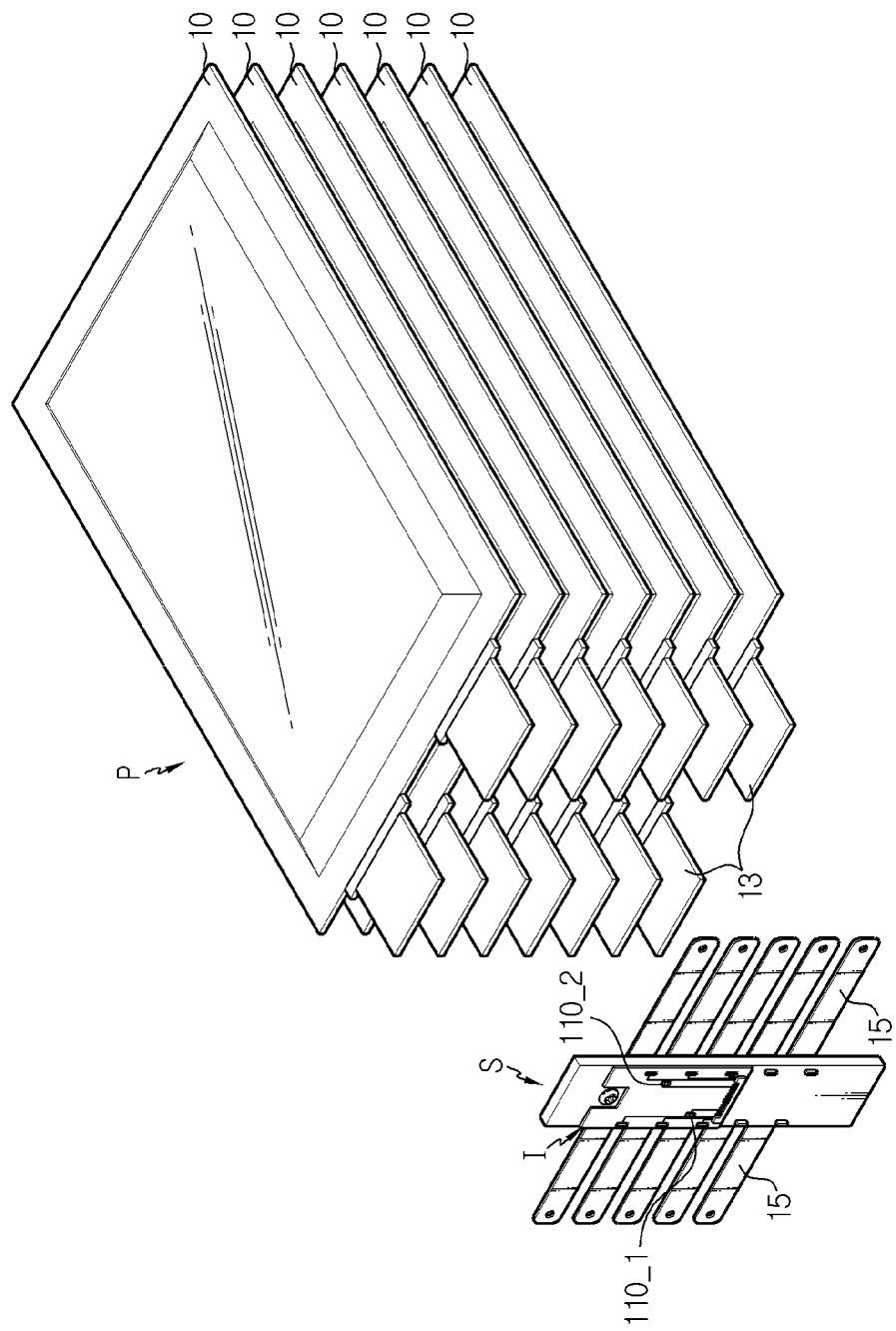
FIG. 3 is a schematic diagram showing parts of a battery module in which a board temperature measuring unit of a battery temperature estimation apparatus according to an embodiment of the present disclosure is mounted on an ICB.

FIG. 3 is a schematic diagram showing parts of the battery module in which the board temperature measuring unit of the battery temperature estimation apparatus according to an embodiment of the present disclosure is mounted on the ICB.

Referring to FIG. 3, the ICB is an integrated circuit board I that is mounted in the sensing assembly S. Here, the sensing assembly S may be provided in the battery pack P to receive information of the secondary battery 10 from the secondary battery electrode lead 13 through the sensing busbar 15. However, in FIG. 3, for convenience of description, each secondary battery electrode lead 13 is shown as being in non-contact with the sensing busbar 15.

The board temperature measuring unit 110 (the first board temperature measuring unit 110_1 and the second board temperature measuring unit 110_2) according to the present disclosure may be mounted on the ICB. Particularly, in the case of the present disclosure, the board temperature measuring unit 110 does not extend out of the secondary battery 10, and may be mounted on the ICB in the form of an element. However, the location in which the integrated circuit board I is mounted as shown in FIG. 3 is for illustration purposes only, and the present disclosure is not limited thereto. That is, the integrated circuit board I may be mounted in the direction of the secondary battery electrode lead 13 of the sensing assembly S, and may be mounted on the sensing assembly S in various forms according to the type of the sensing assembly S.

Referring back to FIG. 1, the calculating unit 120 may calculate the temperature of the secondary battery provided in the battery pack. Particularly, the calculating unit 120 may calculate the temperature of the secondary battery using the temperature of the integrated circuit board measured by the board temperature measuring unit 110 and the ambient temperature of the battery pack. Here, the calculating unit 120 may receive the temperature of the integrated circuit board from the board temperature measuring unit 110 periodically or aperiodically. That is, the calculating unit 120 may calculate the temperature of the secondary battery using the temperature of the integrated circuit board and the ambient temperature of the battery pack as input parameters. Additionally, the ambient temperature of the battery pack may refer to temperature at the location at which the battery pack is mounted. That is to say, the ambient temperature of the battery pack may be the external temperature of the battery pack, and may be room temperature (25° C.). In this instance, the ambient temperature of the battery pack may be received from any other external device of the battery pack, for example, electricals of the vehicle such as an Electronic Control Unit (ECU).

According to the present disclosure, it is possible to estimate the temperature of the secondary battery without actually measuring the temperature of the secondary battery near the secondary battery. Particularly, in the case of the present disclosure, the temperature of the secondary battery may be estimated using the temperature of the integrated circuit board. Accordingly, according to this aspect of the present disclosure, it is possible to improve the utilization of the internal space of the battery pack. More specifically, according to the present disclosure, it is possible to estimate the temperature of the secondary battery quickly and accurately without actually measuring the temperature of the secondary battery from a temperature sensor in contact with the secondary battery or disposed close to the secondary battery. In this case, because the temperature sensor does not need to extend and be disposed in the proximity of the secondary battery, the battery pack may accommodate a larger number of secondary battery, thereby improving the energy density of the battery pack.

Preferably, the calculating unit 120 according to the present disclosure may calculate the temperature of the secondary battery, using a correction factor corresponding to the ambient temperature of the battery pack. Here, the calculating unit 120 may calculate the temperature of the secondary battery by reflecting a correction factor corresponding to the ambient temperature of the battery pack on a difference between the temperature of the integrated circuit board and the ambient temperature of the battery pack. The correction factor will be described in detail as below.

Additionally, preferably, the battery temperature estimation apparatus according to the present disclosure may further include a memory unit 130 as shown in the configuration of FIG. 1.

The memory unit 130 may store the correction factor. Here, the correction factor may be a constant used in the calculation process for estimating the temperature of the secondary battery. Particularly, the memory unit 130 may store the correction factor corresponding to the ambient temperature of the battery pack. That is, the correction factor may have different values depending on the ambient temperature of the battery pack.

Further, according to another aspect of the present disclosure, it is possible to estimate the temperature of the secondary battery based on a simple compensation logic without actually measuring the temperature of the secondary battery from the temperature sensor in contact with or disposed close to the secondary battery. Accordingly, according to this aspect of the present disclosure, a larger number of secondary batteries may be provided in the battery pack, resulting in improved energy density of the battery pack. Additionally, the memory unit 130 may transmit the stored correction factor to the calculating unit 120. For example, when the memory unit 130 receives a data request signal including the ambient temperature of the battery pack from the calculating unit 120, the memory unit 130 may transmit the correction factor corresponding to the ambient temperature of the battery pack to the calculating unit 120. In this instance, the memory unit 130 may transmit the correction factor to the calculating unit 120 periodically or aperiodically.

Additionally, preferably, the battery temperature estimation apparatus according to the present disclosure may further include an ambient temperature measuring unit 140 as shown in the configuration of FIG. 1.

The ambient temperature measuring unit 140 may measure the ambient temperature of the battery pack. For example, the ambient temperature measuring unit 140 may be provided in the battery pack to measure the internal temperature of the battery pack. Alternatively, the ambient temperature measuring unit 140 may be provided outside the battery pack to measure the external temperature of the battery pack. Particularly, in case that the battery pack is mounted in a vehicle, the ambient temperature measuring unit 140 may measure the external temperature of the vehicle or the temperature at the location at which the battery pack is mounted in the vehicle.

Additionally, the ambient temperature measuring unit 140 may transmit the measured ambient temperature of the battery pack to the calculating unit 120. For example, when the ambient temperature measuring unit 140 receives a data request signal from the calculating unit 120, the ambient temperature measuring unit 140 may transmit the measured ambient temperature of the battery pack to the calculating unit 120. In this instance, the ambient temperature measuring unit 140 may transmit the ambient temperature of the battery pack to the calculating unit 120 periodically or aperiodically.

Figure 4:
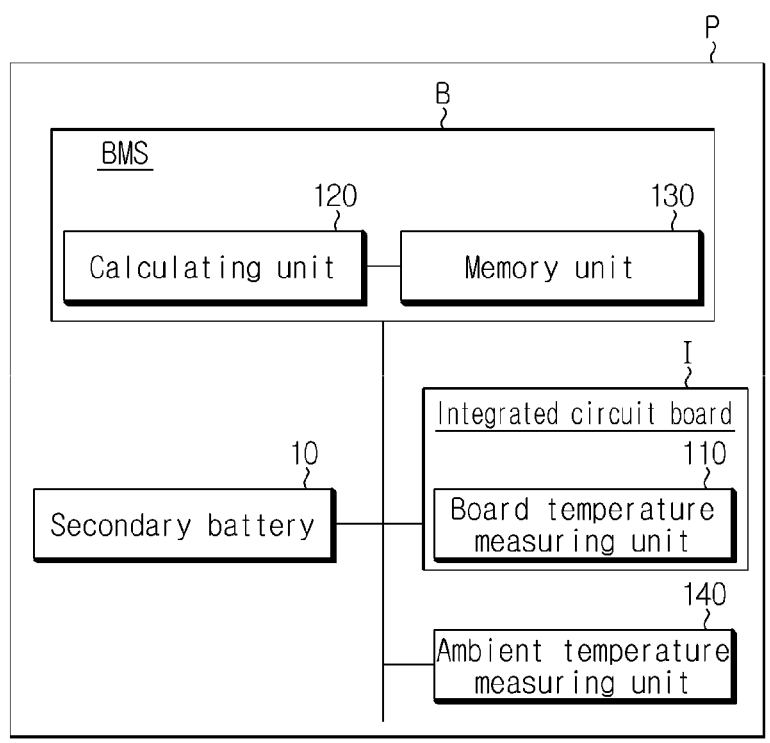
FIG. 4 is a schematic block diagram showing an example of a battery pack to which a battery temperature estimation apparatus according to an embodiment of the present disclosure is applied.

FIG. 4 is a schematic block diagram showing an example of the battery pack to which the battery temperature estimation apparatus according to an embodiment of the present disclosure is applied.

Referring to FIG. 4, the battery may include the secondary battery 10, and the integrated circuit board I connected with the secondary battery 10 may include the board temperature measuring unit 110. Additionally, the integrated circuit board I may be connected with the BMS B to transmit the temperature measured by the board temperature measuring unit 110 to the calculating unit 120. Additionally, the ambient temperature measuring unit 140 may be connected with the BMS B to transmit the temperature measured by the ambient temperature measuring unit 140 to the calculating unit 120.

Particularly, the calculating unit 120 may calculate the temperature of the secondary battery 10, using the temperature of the integrated circuit board I received from the board temperature measuring unit 110 and the ambient temperature of the battery pack P received from the ambient temperature measuring unit 140. More specifically, the calculating unit 120 may calculate the temperature of the secondary battery 10, using a value obtained by multiplying a difference between the temperature of the integrated circuit board I and the ambient temperature of the battery pack P by the correction factor.

Further, preferably, the calculating unit 120 may calculate the temperature of the secondary battery 10, by adding the ambient temperature of the battery pack P to the value obtained by multiplying the difference between the temperature of the integrated circuit board I and the ambient temperature of the battery pack P by the correction factor.

Specifically, the calculating unit 120 may calculate the temperature of the secondary battery 10 using the following Equation.

$$T_{Cell} = (T_{Chip} - T_{Ambient}) \times \text{correction factor} + T_{Ambient} \quad \text{<Equation 1>}$$

Here, $T_{Cell}$ denotes the temperature of the secondary battery 10, $T_{Chip}$ denotes the temperature of the integrated circuit board I measured by the board temperature measuring unit 110, $T_{Ambient}$ denotes the ambient temperature of the battery pack P measured by the ambient temperature measuring unit 140, and correction factor denotes the correction factor.

For example, when $T_{Chip}$ is 26° C., $T_{Ambient}$ is 25° C., and correction factor is 1.06, $T_{Cell}$ may be estimated to be 26.06° C.

Meanwhile, the correction factor may be a constant set to estimate the temperature of the secondary battery 10 according to the temperature of the integrated circuit board I and/or the ambient temperature of the battery pack P. In this instance, the correction factor may be prestored in the memory unit 130.

FIG. 5 is a chart showing the correction factor corresponding to the measured ambient temperature of the battery pack according to an embodiment of the present disclosure.

Particularly, the correction factor may be defined through a temperature measurement experiment. That is, the correction factor may be derived by measuring the temperature of the secondary battery 10, the temperature of the integrated circuit board I and the ambient temperature of the battery pack P through the temperature measurement experiment. That is to say, the correction factor may be defined based on the measured temperature of the secondary battery 10, the measured temperature of the integrated circuit board I and the measured ambient temperature of the battery pack P, obtained through the temperature measurement experiment.

Further, preferably, the memory unit 130 may store the correction factor defined based on the measured temperature of the secondary battery 10, the measured temperature of the integrated circuit board I and the measured ambient temperature of the battery pack P, obtained through the temperature measurement experiment.

Specifically, the correction factor may be defined using the following Equation.

$$\frac{(T_{Cellreal} - T_{Ambientreal})}{(T_{Cellreal} - T_{Ambientreal})} = \text{correction factor} \qquad \text{<Equation 2>}$$

Here, $T_{Cell}$ real denotes the measured temperature of the secondary battery 10, $T_{Chip}$ real denotes the measured temperature of the integrated circuit board I measured by the board temperature measuring unit 110, and $T_{Ambient}$ real denotes the measured ambient temperature of the battery pack P measured by the ambient temperature measuring unit 140, and correction factor denotes the correction factor.

In the above<Equation 2>, when a difference between the measured temperature of the secondary battery 10 and the measured ambient temperature of the battery pack P is a first factor, and a difference between the measured temperature of the integrated circuit board I and the measured ambient temperature of the battery pack P is a second factor, a value obtained by dividing the first factor by the second factor may be the correction factor.

For example, when $T_{Cell\ real}$ is 26.06° C., $T_{Chip\ real}$ is 26° C., and $T_{Ambient}$ real is 25° C., correction factor may be calculated to be 1.06.

Here, referring to FIG. 5, it is found that the correction factor obtained through the temperature measurement experiment corresponds to the measured ambient temperature of the battery pack P.

As a specific embodiment, in (a) of FIG. 5, when the measured ambient temperature of the battery pack P is −20° C., the correction factor was defined as 1.19. Additionally, in (b), when the measured ambient temperature of the battery pack P is 0° C., the correction factor is defined as 1.18. Additionally, in (c), when the measured ambient temperature of the battery pack P is 10° C., the correction factor is defined as 1.15. Additionally, in (d), when the measured ambient temperature of the battery pack P is 20° C., the correction factor is defined as 1.05. Additionally, in (e), when the measured ambient temperature of the battery pack P is 25° C., the correction factor is defined as 1.06. Additionally, in (f), when the measured ambient temperature of the battery pack P is 50° C., the correction factor is defined as 0.95. According to an embodiment of the present disclosure, the correction factor corresponding to the measured ambient temperature of the battery pack P may be prestored in the memory unit.

Particularly, the correction factor may have a correction coefficient. That is, the correction factor may have a correction coefficient defined based on the mean correction factor obtained through the temperature measurement experiment. That is to say, the correction factor may have two correction coefficients.

More specifically, the correction coefficient may be derived using the following Equation.

$$\text{correction factor}_{Mean} = A \times T_{Ambient\ real} + A_1 \qquad \text{<Equation 3>}$$

Here, $A_0$ is the first correction coefficient, and $A_1$ is the second correction coefficient. For example, the correction coefficient, namely, the first correction coefficient and the second correction coefficient, may be defined through a mathematical analysis between the mean correction factor and the measured ambient temperature of the battery pack P. Particularly, the correction coefficient may be defined through a trend line analysis between the mean correction factor and the measured ambient temperature of the battery pack P. Its specific embodiment will be described with reference to FIG. 6.

Figure 6:
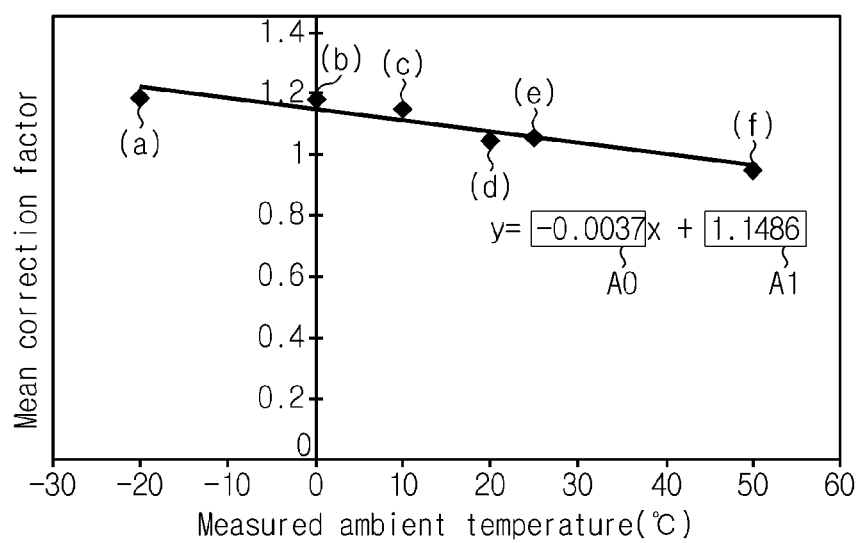
FIG. 6 is a graph showing a correction coefficient derived based on a relationship between a measured ambient temperature and a mean correction factor of a battery pack according to an embodiment of the present disclosure.

FIG. 6 is a graph showing the correction coefficient derived based on a relationship between the measured ambient temperature of the battery pack and the mean correction factor according to an embodiment of the present disclosure.

The graph of FIG. 6 shows (a) to (f) data of FIG. 3, when the mean correction factor is a Y-axis value, and the measured ambient temperature of the battery pack P is an X-axis value.

As described above, the correction coefficient may be defined through a mathematical analysis using data obtained through the temperature measurement experiment. For example, the correction coefficient may be defined through a trend line analysis using the mean correction factor and the measured ambient temperature of the battery pack P obtained through the temperature measurement experiment. In this instance, the correction coefficient may be stored in the memory unit 130.

As a specific embodiment, in the graph of FIG. 6, the following Equation may be derived through the trend line analysis of (a) to (f) data.

$$Y = (-0.0037) \times X + (1.1486) \qquad \text{<Equation 4>}$$

Here, Y denotes the mean correction factor, and X denotes the measured ambient temperature of the battery pack P. In the embodiment of FIG. 6, the derived first correction coefficient is −0.0037, and the derived second correction coefficient is 1.1486. In this instance, the derived first and second correction coefficients may be stored in the memory unit 130.

Further, preferably, the calculating unit 120 may calculate the temperature of the secondary battery 10 using the correction coefficient.

Specifically, the calculating unit 120 may calculate the correction factor using the following Equation, and calculate the temperature of the secondary battery 10 by substituting the calculated correction factor into the above<Equation 1>.

$$\text{correction factor} = A_0 \times T_{Ambient} + A_1 \qquad \text{<Equation 5>}$$

Here, $A_0$ denotes the first correction coefficient, and $A_1$ denotes the second correction coefficient. Here, the calculating unit 120 may calculate the correction factor based on the ambient temperature $T_{Ambient}$ of the battery pack P received from the ambient temperature measuring unit 140. Particularly, the correction factor may correspond to the ambient temperature of the battery pack P. In this instance, the calculating unit 120 may calculate the correction factor based on the first correction coefficient and the second correction coefficient received from the memory unit 130.

More specifically, the calculating unit 120 may calculate the temperature of the secondary battery 10 through calculation of the above<Equation 1>, using the correction factor calculated in the above<Equation 5>, the temperature of the integrated circuit board I measured by the board temperature measuring unit 110 and the ambient temperature of the battery pack P measured by the ambient temperature measuring unit 140 as input parameters.

For example, when the temperature of the integrated circuit board I is 26° C., the ambient temperature of the battery pack P is 25° C., and the correction factor is 1.06, the temperature of the secondary battery 10 may be estimated as 26.06° C.

The battery temperature estimation apparatus according to the present disclosure may be provided in the battery pack itself. That is, the battery pack according to the present disclosure may include the battery temperature estimation apparatus according to the present disclosure as described above. Here, the battery pack may include at least one secondary battery 10, the above-described battery temperature estimation apparatus, electricals (for example, the BMS B, relay, fuse, etc.) and a case. In this configuration, at least some of the elements of the battery temperature estimation apparatus according to the present disclosure may be implemented by supplementing or adding the functions of the components included in the conventional battery. For example, the board temperature measuring unit 110, the calculating unit 120, the memory unit 130 and/or the ambient temperature measuring unit 140 of the battery temperature estimation apparatus according to the present disclosure may be implemented by the Battery Management System (BMS) B provided in the battery pack P. Meanwhile, the battery may be a concept encompassing the battery module or the battery pack P.

Meanwhile, although FIG. 2 describes the battery pack P including one secondary battery 10, the present disclosure is not necessarily limited to this embodiment. That is, the battery pack P may include a plurality of secondary batteries 10. In this case, according to the number of secondary batteries 10, a plurality of board temperature measuring units 110 may be provided, or the correction coefficient or the correction factor may be differently set for each secondary battery. Additionally, in case that a plurality of board temperature measuring units 110 is provided, the temperature of one secondary battery may be estimated based on the temperatures measured by the plurality of board temperature measuring units 110.

Figure 7:
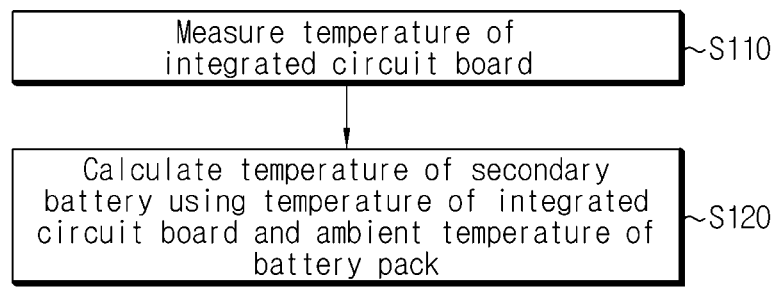
FIG. 7 is a schematic flowchart showing a battery temperature estimation method according to an embodiment of the present disclosure.
Figure 8:
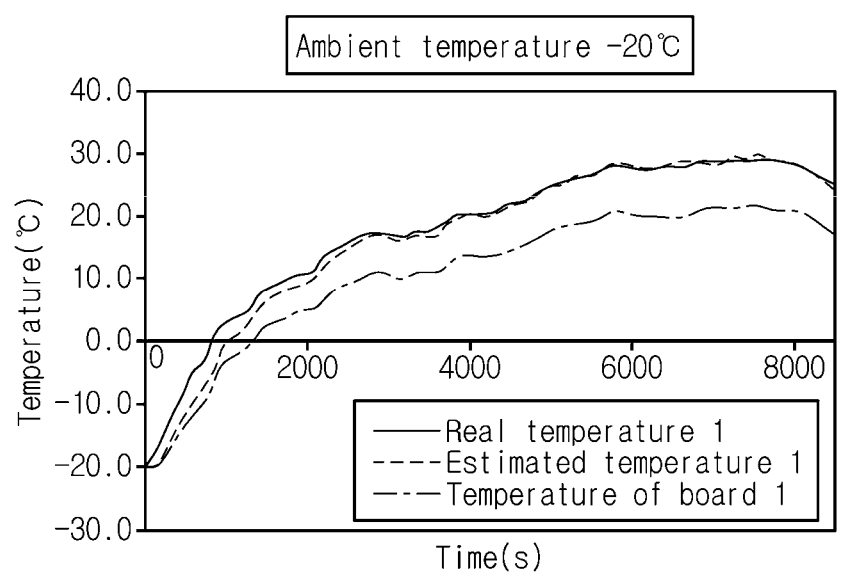
FIGS. 8 to 11 are graphs showing comparisons of estimated temperatures of secondary batteries as a function of ambient temperatures of battery packs of examples and comparative examples according to the present disclosure.
Figure 9:
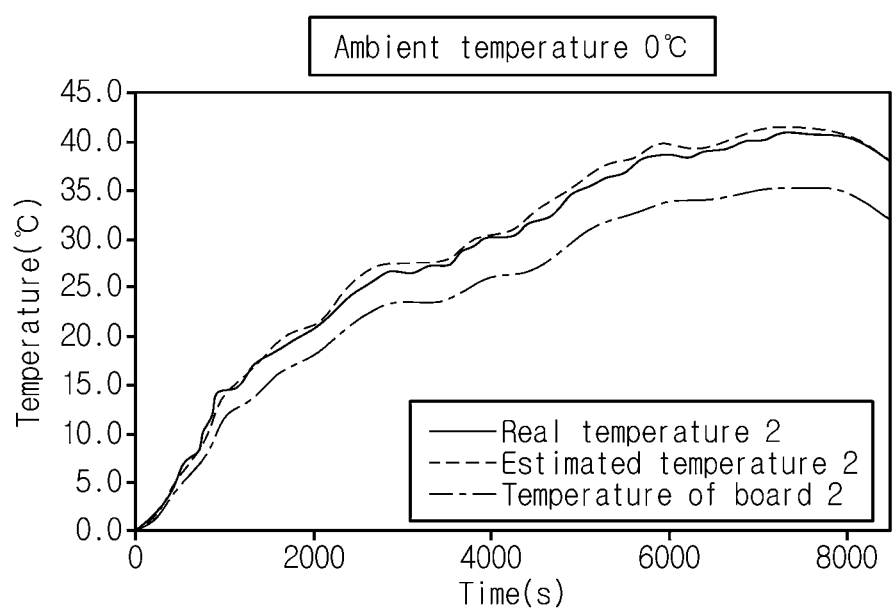
Figure 10:
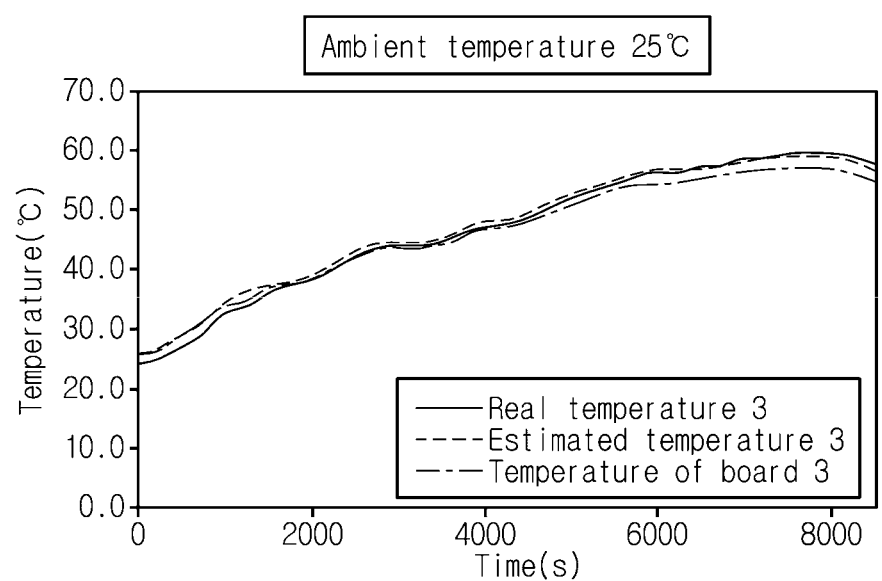
Figure 11:
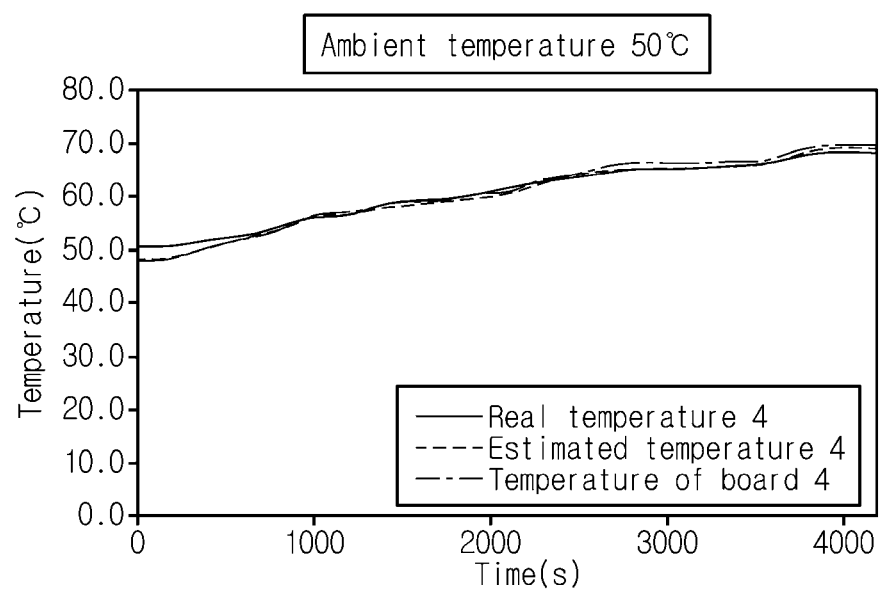

FIG. 7 is a schematic flowchart showing a battery temperature estimation method according to an embodiment of the present disclosure. In FIG. 7, the subject that performs each step may be each component of the battery temperature estimation apparatus according to the present disclosure as previously described.

As shown in FIG. 7, the battery temperature estimation method according to the present disclosure includes the temperature measuring step (S110) and the calculating step (S120).

First, in the temperature measuring step S110, the temperature of the integrated circuit board provided in the battery pack may be measured. Additionally, in the calculating step S120, the temperature of the secondary battery may be calculated based on the temperature of the integrated circuit board measured in the temperature measuring step S110.

Particularly, the battery temperature estimation method according to the present disclosure may further include, before the calculating step (S120), measuring the ambient temperature of the battery pack. In this case, in the calculating step (S120), the temperature of the secondary battery may be calculated based on the temperature of the integrated circuit board and the ambient temperature of the battery pack. Further, in the calculating step (S120), the temperature of the secondary battery may be calculated using the correction factor corresponding to the ambient temperature of the battery pack. Specifically, in the calculating step (S120), the temperature of the secondary battery may be calculated by reflecting the correction factor corresponding to the ambient temperature of the battery pack on a difference between the temperature of the integrated circuit board and the ambient temperature of the battery pack.

Further, the calculating step (S120) may include calculating the temperature of the secondary battery using a value obtained by multiplying the difference between the temperature of the integrated circuit board and the ambient temperature of the battery pack by the correction factor.

Further, the calculating step (S120) may include calculating the temperature of the secondary battery by adding the ambient temperature of the battery pack to the value obtained multiplying the difference between the temperature of the integrated circuit board and the ambient temperature of the battery pack by the correction factor.

Preferably, the battery temperature estimation method according to the present disclosure may further include, before the calculating step (S120), storing the correction factor corresponding to the ambient temperature of the battery pack. In this case, in the calculating step (S120), the temperature of the secondary battery may be calculated based on the stored correction factor.

Further, the storing step may include storing the correction factor defined based on the measured temperature of the secondary battery, the measured temperature of the integrated circuit board and the measured ambient temperature of the battery pack, obtained through the temperature measurement experiment.

Further, the correction factor stored in the storing step may have the correction coefficient defined based on the mean value obtained by dividing the first factor by the second factor and the measured ambient temperature of the battery pack, when a difference between the measured temperature of the secondary battery and the measured ambient temperature of the battery pack is the first factor, and a difference between the measured temperature of the integrated circuit board and the measured ambient temperature of the battery pack is the second factor.

Further, preferably, the calculating step (S120) may include calculating the temperature of the secondary battery using the correction coefficient stored in the storing step.

Hereinafter, the present disclosure will be described in more detail through examples to provide a more detailed explanation. However, the examples according to the present disclosure may be modified in many different forms, and the scope of the present disclosure should not be interpreted as being limited to the following examples. The examples of the present disclosure are provided for a full understanding of those having ordinary skill in the art.

Examples 1 to 4

As examples 1 to 4 samples, a battery pack P was configured as shown in FIG. 3, and a chip thermistor was mounted on an ICB, to measure the temperature of the integrated circuit board I. Additionally, the temperature of a particular secondary battery provided in the battery pack was estimated through the battery temperature estimation apparatus according to the present disclosure under varying ambient temperature conditions of the battery pack. Particularly, example 1 was carried out under the temperature condition in which the ambient temperature of the battery pack was −20° C., and example 2 was carried out under the temperature condition in which the ambient temperature of the battery pack was 0° C. Additionally, examples 3 and 4 were carried out under the temperature condition in which the ambient temperature of the battery pack was 25° C. and 50° C. respectively.

More specifically, first, the temperature of the integrated circuit board was measured by the chip thermistor (i.e., the board temperature measuring unit) under the ambient temperature condition of each battery pack of examples 1 to 4. Additionally, the temperature of the integrated circuit board measured under the ambient temperature condition of each battery pack was indicated as temperatures of board 1 to 4 in FIGS. 8 to 11.

Subsequently, the estimated temperature or the compensated temperature of examples 1 to 4 was calculated according to <Equation 1> and <Equation 5>. Here, for the compensation coefficient used in <Equation 5>, the correction coefficient derived through the above <Equation 2> and <Equation 3> was used.

Additionally, the temperature of the secondary battery was calculated under the ambient temperature condition of each battery pack, and the estimated temperature of the secondary battery estimated through calculation is indicated as estimated temperatures 1 to 4 in FIGS. 8 to 11.

Additionally, to test the accuracy of the estimated temperature, a temperature sensor was attached to a target secondary battery for temperature estimation under the ambient temperature condition of each battery pack and the temperature of the corresponding secondary battery was measured during charge/discharge cycles of the battery pack. Additionally, the actually measured results are indicated as real temperatures 1 to 4 in FIGS. 8 to 11.

Referring to FIGS. 8 to 11, it can be seen that a difference between the estimated temperature of the secondary battery estimated based on the temperature of the integrated circuit board and the actually measured temperature of the secondary battery is very small. Particularly, seeing the results of FIGS. 8 and 9 at the ambient temperature of the battery pack of −20° C. and 0° C., a difference between the temperature of the integrated circuit board and the real temperature value of the secondary battery is large, and also, in this case, it can be seen that according to the battery temperature estimation apparatus of the present disclosure, the estimated temperature is very close to the real temperature. Accordingly, it can be seen that according to the present disclosure, even in a situation that the ambient temperature of the battery pack is low, the temperature of the secondary battery is measured very accurately through measurements of the temperature of the board. Further, by referring to the results of FIGS. 8 and 9, it can be seen that with the increasing charge/discharge cycles of the battery pack, the difference between the real temperature of the secondary battery and the temperature of the integrated circuit board increases over time. Also, in this case, it can be seen that according to the battery temperature estimation apparatus of the present disclosure, the estimated temperature is very close to the real temperature.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure, the scope of the appended claims and their equivalents.

Meanwhile, the term 'unit' such as 'temperature measuring unit', 'memory unit' and 'calculating unit' is used herein, but it is obvious to those skilled in the art that this indicates a logical component unit and does not necessarily indicate a component that may be or should be physically separated from other.

What is claimed is:

1. A battery temperature estimation apparatus for estimating temperature of at least one secondary battery in a battery pack including at least one secondary battery, the battery temperature estimation apparatus comprising:
a board temperature measuring unit mounted on an integrated circuit board provided in the battery pack, the board temperature measuring unit being configured to measure a temperature of the integrated circuit board; and
a calculating unit configured to:
calculate an estimated temperature of the secondary battery using:
the temperature of the integrated circuit board measured by the board temperature measuring unit; and
an ambient temperature of the battery pack, the ambient temperature being measured by an ambient temperature measuring unit; and
a memory configured to store a plurality of correction factors respectively corresponding to a plurality of ambient temperatures,
wherein the calculating unit is further configured to calculate the estimated temperature of the secondary battery by applying one of the correction factors stored in the memory, corresponding to the ambient temperature of the battery pack, to a difference between the temperature of the integrated circuit board and the ambient temperature of the battery pack, and
wherein the calculating unit is further configured to calculate the estimated temperature of the secondary battery based on an equation:

$$T_{Cell} = (T_{Chip} - T_{Ambient}) \times \text{correction factor} + T_{Ambient},$$

where $T_{Cell}$ is the estimated temperature of the secondary battery, $T_{Chip}$ is the temperature of the integrated circuit board, and $T_{Ambient}$ is the ambient temperature of the battery pack.

2. The battery temperature estimation apparatus according to claim 1, wherein the calculating unit is further configured to calculate the estimated temperature of the secondary battery using a value obtained by multiplying the difference between the temperature of the integrated circuit board and the ambient temperature of the battery pack by the one of the correction factors.

3. The battery temperature estimation apparatus according to claim 2, wherein the calculating unit is further configured to calculate the estimated temperature of the secondary battery by adding the ambient temperature of the battery pack to the value obtained by multiplying the difference between the temperature of the integrated circuit board and the ambient temperature of the battery pack by the one of the correction factors.

4. The battery temperature estimation apparatus according to claim 1, wherein the memory is further configured to:

transmit the one of the correction factors corresponding to the ambient temperature of the battery pack to the calculating unit.

5. The battery temperature estimation apparatus according to claim 4, wherein the memory is further configured to store the correction factors, each defined based on a measured temperature of the secondary battery, a measured temperature of the integrated circuit board, and a measured ambient temperature of the battery pack, obtained through a prior temperature measurement operation.

6. The battery temperature estimation apparatus according to claim 5, wherein each of the correction factors has a correction coefficient defined based on a mean value obtained by dividing a difference value between the prior measured temperature of the secondary battery and the prior measured ambient temperature of the battery pack by a difference value between the prior measured temperature of the integrated circuit board and the prior measured ambient temperature of the battery pack, and the prior measured ambient temperature of the battery pack.

7. The battery temperature estimation apparatus according to claim 6, wherein the calculating unit is further configured to calculate the estimated temperature of the secondary battery using the correction coefficient corresponding to the one of the correction factors.

8. The battery temperature estimation apparatus according to claim 1, wherein the ambient temperature measuring unit is configured to:
measure the ambient temperature of the battery pack; and
transmit the measured ambient temperature to the calculating unit.

9. The battery temperature estimation apparatus according to claim 1, wherein the one of the correction factors is defined based on:

$$(T_{cell\ real} - T_{Ambient\ real})/(T_{Chip\ real} - T_{Ambient\ real}),$$

where $T_{Cell\ real}$ is a measured temperature of the secondary battery, $T_{Ambient\ real}$ is a measured ambient temperature of the battery pack, and $T_{Chip\ real}$ is a measured temperature of the integrated circuit board, each measured in a prior temperature measurement operation.

10. A battery pack comprising the battery temperature estimation apparatus according to claim 1.

11. The battery pack of claim 10, further comprising a battery management system (BMS), the BMS including at least the calculating unit and the memory, wherein the BMS is configured to control the battery pack based on the estimated temperature of the secondary battery.

12. A battery temperature estimation method for estimating temperature of at least one secondary battery in a battery pack including at least one secondary battery, the battery temperature estimation method comprising:
measuring a temperature of an integrated circuit board provided in the battery pack;
determining a correction factor, among a plurality of correction factors stored in a memory, corresponding to an ambient temperature of the battery pack measured by an ambient temperature measuring unit; and
calculating an estimated temperature of the secondary battery by applying the determined correction factor stored in the memory, corresponding to the ambient temperature of the battery pack, to a difference between:
the temperature of the integrated circuit board measured in the measuring of the temperature; and
the ambient temperature of the battery pack,
wherein the calculating includes calculating the estimated temperature of the secondary battery based on an equation:

$$T_{Cell} = (T_{Chip} - T_{Ambient}) \times \text{correction factor} + T_{Ambient},$$

where $T_{Cell}$ is the estimated temperature of the secondary battery, $T_{Chip}$ is the temperature of the integrated circuit board, and $T_{Ambient}$ is the ambient temperature of the battery pack.

13. The battery temperature estimation method according to claim 12, further comprising:
controlling the battery pack based on the estimated temperature of the secondary battery.

14. The battery temperature estimation method according to claim 12, wherein the determined correction factors is defined based on:

$$(T_{cell\ real} - T_{Ambient\ real})/(T_{Chip\ real} - T_{Ambient\ real}),$$

where $T_{Cell\ real}$ is a measured temperature of the secondary battery, $T_{Ambient\ real}$ is a measured ambient temperature of the secondary battery, and $T_{Chip\ real}$ is a measured temperature of the integrated circuit board, each measured in a prior temperature measurement operation.

* * * * *